United States Patent
Hagiwara

(10) Patent No.: US 7,655,926 B2
(45) Date of Patent: Feb. 2, 2010

(54) RARE EARTH ACTIVATED ALKALINE EARTH METAL FLUOROHALIDE STIMULABLE PHOSPHOR AND RADIATION IMAGE CONVERSION PANEL EMPLOYING THE SAME

(75) Inventor: Kiyoshi Hagiwara, Tokyo (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 204 days.

(21) Appl. No.: 11/817,366

(22) PCT Filed: Mar. 1, 2006

(86) PCT No.: PCT/JP2006/303838

§ 371 (c)(1),
(2), (4) Date: Aug. 29, 2007

(87) PCT Pub. No.: WO2006/095613

PCT Pub. Date: Sep. 14, 2006

(65) Prior Publication Data

US 2009/0039287 A1 Feb. 12, 2009

(30) Foreign Application Priority Data

Mar. 9, 2005 (JP) ............................. 2005-065058

(51) Int. Cl.
*H05B 33/00* (2006.01)

(52) U.S. Cl. ................................ 250/484.4

(58) Field of Classification Search ............... 250/484.4
See application file for complete search history.

(56) References Cited

U.S. PATENT DOCUMENTS

| | | | | |
|---|---|---|---|---|
| 3,640,887 A * | 2/1972 | Anderson | ................... | 252/625 |
| 4,042,527 A * | 8/1977 | Kano et al. | ........... | 252/301.4 H |
| 5,653,830 A * | 8/1997 | Fleig et al. | .................... | 156/67 |
| 2001/0020696 A1* | 9/2001 | Srivastava et al. | .......... | 252/79.1 |
| 2001/0035502 A1* | 11/2001 | Arakawa et al. | ......... | 250/484.4 |

FOREIGN PATENT DOCUMENTS

| | | |
|---|---|---|
| JP | 10140148 | 5/1998 |
| JP | 10147778 | 6/1998 |
| JP | 2002038143 | 2/2002 |
| JP | 2003268369 | 9/2003 |

* cited by examiner

*Primary Examiner*—David P Porta
*Assistant Examiner*—Kiho Kim
(74) *Attorney, Agent, or Firm*—Lucas & Mercanti, LLP

(57) ABSTRACT

Provided are a rare earth activated alkaline earth metal fluorohalide stimulable phosphor exhibiting high image quality of radiation images and reduction of luminance degradation, and a radiation image conversion panel employing the stimulable phosphor represented by Formula (1) $Ba_{(1-x)}M^2_{(x)}FBr_{(y)}I_{(1-y)}:aM^1, bLn, cO$, wherein $M^1$ is at least an alkali metal selected from the group consisting of Li, Na, K, Rb and Cs; $M^2$ is at least an alkaline earth metal selected from the group consisting of Be, Mg, Sr and Ca; Ln is at least a rare earth element selected from the group consisting of Ce, Pr, Sm, Eu, Gd, Tb, Tm, Dy, Ho, Nd, Er and Yb; and x, y, a, b and c are values meeting the following conditions: $0 \leq x \leq 0.3$, $0 \leq y \leq 0.9$, $0 \leq a \leq 0.05$ $0 < b \leq 0.2$ and $0 \leq c \leq 0.1$, wherein a spectral width at 80% intensity to the maximum intensity of an instantaneous excitation spectrum is 23.0 nm or less.

4 Claims, 1 Drawing Sheet

RARE EARTH ACTIVATED ALKALINE EARTH METAL FLUOROHALIDE STIMULABLE PHOSPHOR AND RADIATION IMAGE CONVERSION PANEL EMPLOYING THE SAME

TECHNICAL FIELD

The present invention relates to rare earth activated alkaline earth metal fluorohalide stimulable phosphor and a radiation image conversion panel employing the same.

BACKGROUND

In recent years, a radiation image recording and reproducing method employing stimulable phosphor has been utilized in place of a radiographic method employed in combination with a conventional radiographic film and an intensifying screen.

In the method, a radiation image conversion panel (also called a phosphor-accumulating sheet) comprising a stimulable phosphor is employed, and the method comprises the steps of causing the stimulable phosphor of the panel to absorb radiation having passed through an object or having been radiated from an object, sequentially exciting the stimulable phosphor with an electromagnetic wave such as visible light or infrared rays (hereinafter referred to also as "stimulating light") to release the radiation energy stored in the phosphor as light emission (stimulated emission), photoelectrically detecting the emitted light to obtain electrical signals, and reproducing the radiation image of the object as a visible image from the electrical signals. The panel, having been read out, is then subjected to image-erasing and prepared for the next photographing cycle. Thus, the radiation image conversion panel can be used repeatedly.

In the radiation image recording and reproducing method described above, a radiation image is advantageously obtained with a sufficient amount of information by applying radiation to an object at a considerably smaller dose, as compared to the conventional radiographic method. Further, in conventional radiography, the radiographic film is consumed for every photographing; on the other hand, in this radiation image converting method, in which the radiation image conversion panel is employed repeatedly, is also advantageous in terms of conservation of resources and overall economic efficiency.

The radiation image conversion panel employed in the radiation image recording and reproducing method basically comprises a support and provided thereon a phosphor layer (stimulable phosphor layer), provided that, in cases where the phosphor layer is self-supporting, the support is not necessarily desired. The stimulable phosphor layer comprises a stimulable phosphor dispersed in a binder. There is also known a stimulable phosphor layer, which is formed by vacuum evaporation or a sintering process, free from a binder, and which comprises an aggregated stimulable phosphor. There is further known a radiation image conversion panel in which a polymeric material is contained in the openings among the aggregated stimulable phosphor. In addition, a protective film composed of a polymeric film or an evaporated inorganic film is provided on the surface on the stimulable phosphor support side and on the surface on the opposite side.

The stimulable phosphor, after being exposed to radiation, produces stimulated emission upon exposure to the stimulating light. In practical use, phosphors are employed, which exhibit an emission within a wavelength region of 300-500 nm stimulated by stimulating light of wavelengths of 400-900 nm. Examples of such stimulable phosphors include rare earth activated alkaline earth metal fluorohalide phosphors described in Japanese Patent O.P.I. Publication Nos. 59-56479 and 59-56480; bivalent europium activated alkaline earth metal fluorohalide phosphors described in Japanese Patent O.P.I. Publication Nos. 61-235486 and 61-235487; rare earth element activated oxyhalide phosphors described in Japanese Patent O.P.I. Publication No. 55-12144; cerium activated trivalent metal oxyhalide phosphors described in Japanese Patent O.P.I. Publication No. 58-69281; bismuth activated alkaline metal halide phosphors described in Japanese Patent O.P.I. Publication No. 60-70484; bivalent europium activated alkaline earth metal halophosphate phosphors described in Japanese Patent O.P.I. Publication Nos. 60-141783 and 60-157100; bivalent europium activated alkaline earth metal haloborate phosphors described in Japanese Patent O.P.I. Publication No. 60-157099; bivalent europium activated alkaline earth metal hydrogenated halide phosphors described in Japanese Patent O.P.I. Publication No. 60-217354; cerium activated rare earth complex halide phosphors described in Japanese Patent O.P.I. Publication Nos. 61-21173 and 61-21182; cerium activated rare earth halophosphate phosphors described in Japanese Patent O.P.I. Publication No. 61-40390; bivalent europium activated cesium rubidium halide phosphors described in Japanese Patent O.P.I. Publication No. 60-78151; bivalent europium activated cerium halide rubidium phosphors described in Japanese Patent O.P.I. Publication No. 60-78151; and bivalent europium activated composite halide phosphors described in Japanese Patent O.P.I. Publication No. 60-78153.

It is known that iodide-containing bivalent europium activated alkaline earth metal fluorohalide phosphors, iodide containing rare earth metal activated oxyhalide phosphors and iodide containing bismuth activated alkaline earth metal halide phosphors specifically exhibit high sensitivity stimulated luminescence.

Along with the spread of radiation image conversion panels employing stimulable phosphors is further desired an enhancement of radiation image quality, such as enhancement in sharpness and graininess. Especially in recent years, stimulable phosphor exhibiting high luminance and reduction of sharpness drop caused by X-ray damage has been demanded.

The preparation method of stimulable phosphor is called a solid phase process or calcination method, in which pulverization after calcination is indispensable, however, there were problems such that it was difficult to control the particle form affecting sensitivity and image performance. Of means for enhancing image quality of radiation images is valid preparation of fine particles of a stimulable phosphor and enhancing particle size uniformity of the fine stimulable phosphor particles, i.e., narrowing the particle size distribution.

Preparation of stimulable phosphors in the liquid phase described in Japanese Patent O.P.I. Publication Nos. 7-233369 and 9-291278 is a method of obtaining a stimulable phosphor precursor in the form of fine particles by adjusting the concentration of a phosphor raw material solution, which is valid as a method of preparing stimulable phosphor powder having a narrow particle size distribution. Of rare earth activated alkaline earth metal fluorohalide stimulable phosphors, a phosphor having higher iodide content is preferred in terms of reduction of radiation exposure. This is due to the fact that iodine exhibits a higher X-ray absorption than bromine. That is, alkaline earth metal fluoroiodide stimulable phosphors prepared in the liquid phase are advantageous in luminance and graininess.

To enhance the yield of a rare earth activated alkaline earth metal fluorohalide stimulable phosphor, specifically, an alkaline earth metal fluoroiodide stimulable phosphor, there is disclosed a method for obtaining cubic or rectangular rare earth element-containing barium fluoroiodide crystals having a basic composition of BaFI:xLn (in which Ln: is at least a rare earth element selected from Ce, Pr, Sm, Eu, Gd, Tb, Tm and Yb, 0<x≦0.1) which is obtained by adding a fluorine source to the mother liquor and concentrating the solution (Japanese Patent O.P.I. Publication No. 11-29324).

A method of preparing an oxygen-introduced rare earth activated alkaline earth metal fluorohalide stimulable phosphor having a small particle diameter together with a narrow particle diameter distribution is described in Patent Documents 1 and 2.

However, along with active utilization of the radiation image conversion method employing stimulable phosphor, further demanded have been improved image quality of the resulting radiation images together with, for example, improved luminance and graininess and reduction of luminance degradation caused by X-ray damage through repetitive use.

Patent Document 1: Japanese Patent O.P.I. 2002-38143
Patent Document 2: Japanese Patent O.P.I. 2003-268369

DISCLOSURE OF THE INVENTION

Problems to be Solved by the Present Invention

It is an object of the present invention to provide a rare earth activated alkaline earth metal fluorohalide stimulable phosphor exhibiting high image quality of the resulting radiation images together with reduction of luminance degradation caused by X-ray damage through repetitive use, and a radiation image conversion panel employing the stimulable phosphor.

Means to Solve the Problems

The above object of the present invention is accomplished by the following structures.

(Structure 1) A rare earth activated alkaline earth metal fluorohalide stimulable phosphor represented by the following Formula (1), wherein a spectral width at an intensity of 80% to the maximum intensity of an instantaneous excitation spectrum is 23.0 nm or less,

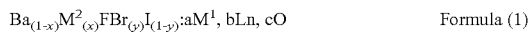

where $M^1$ is at least an alkali metal selected from the group consisting of Li, Na, K, Rb and Cs; $M^2$ is at least an alkaline earth metal selected from the group consisting of Be, Mg, Sr and Ca; Ln is at least a rare earth element selected from the group consisting of Ce, Pr, Sm, Eu, Gd, Tb, Tm, Dy, Ho, Nd, Er and Yb; and x, y, a, b and c are values meeting the following conditions: $0 \leq x \leq 0.3$, $0 \leq y \leq 0.9$, $0 \leq a \leq 0.05$ $0 < b \leq 0.2$ and $0 \leq c \leq 0.1$, respectively, provided that $0 \leq y \leq 0.8$ is more preferable in the case of the value of y.

(Structure 2) The rare earth activated alkaline earth metal fluorohalide stimulable phosphor of Structure 1, wherein the spectral width is 22.0 nm or less.

(Structure 3) The rare earth activated alkaline earth metal fluorohalide stimulable phosphor of Structure 1 or 2, wherein y in Formula (1) is equal to 0.

(Structure 4) A radiation image conversion panel comprising a support and provided thereon, a stimulable phosphor layer, wherein a stimulable phosphor contained in the stimulable phosphor layer is the rare earth activated alkaline earth metal fluorohalide stimulable phosphor of any one of Structures 1-3.

Possibility of Industrial Use

Via the present invention, provided can be a rare earth activated alkaline earth metal fluorohalide stimulable phosphor exhibiting high image quality of the resulting radiation images together with reduction of luminance degradation caused by X-ray damage through repetitive use, and a radiation image conversion panel employing the stimulable phosphor.

DESCRIPTION OF THE PREFERRED EMBODIMENTS

Figure 1:
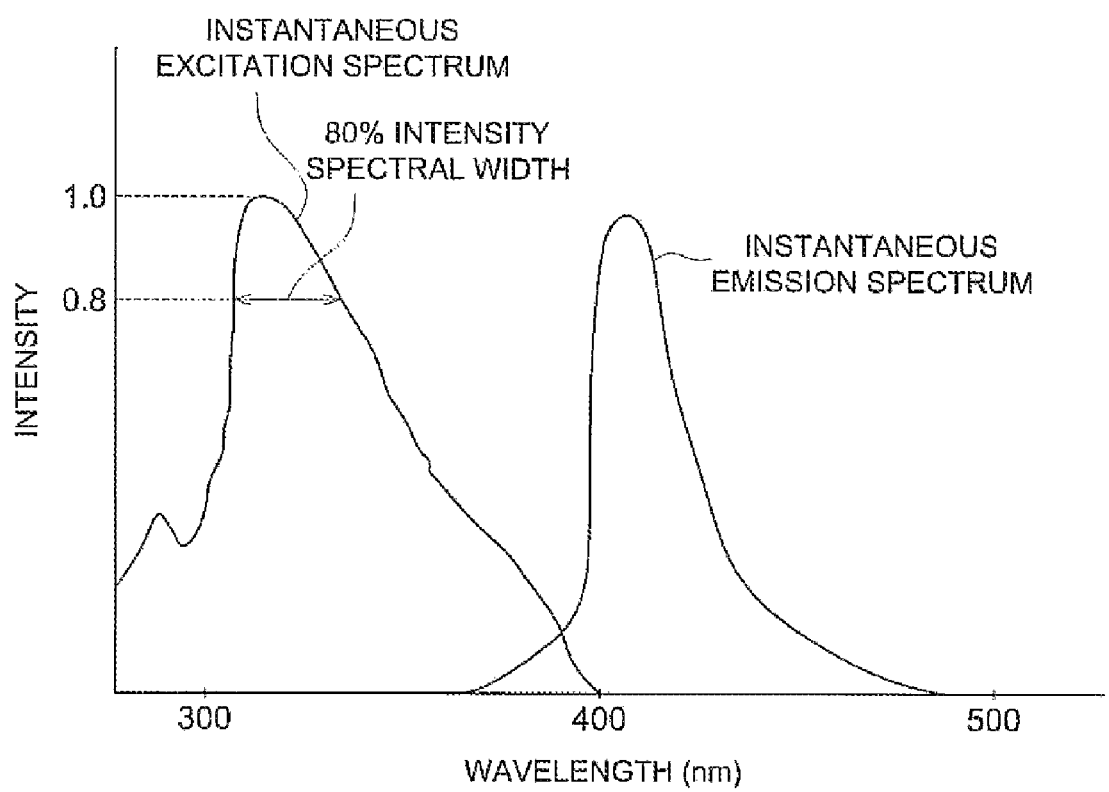
FIG. 1 is a figure showing an instantaneous excitation spectrum, an instantaneous emission spectrum and an 80% intensity spectral width of a radiation image conversion panel comprising CsBr:Eu stimulable phosphor.

After considerable effort during intensive studies, the inventors have found out that a rare earth activated alkaline earth metal fluorohalide stimulable phosphor exhibiting high image quality of the resulting radiation images together with reduction of luminance degradation caused by X-ray damage through repetitive use, and a radiation image conversion panel employing the stimulable phosphor can be obtained by utilizing the rare earth activated alkaline earth metal fluorohalide stimulable phosphor represented by foregoing Formula (1), wherein a spectral width at an intensity of 80% to the maximum intensity of an instantaneous excitation spectrum is 23.0 nm or less.

Next, the present invention will be described in detail.

[Spectral Width at 80% Intensity to the Maximum Intensity of Instantaneous Excitation Spectrum]

It is a feature in stimulable phosphor of the present invention that a spectral width at an intensity of 80% to the maximum intensity of an instantaneous excitation spectrum is 23.0 nm or less.

In the radiation image recording, after radiation irradiated from a radiation source is decreased by a radiation aperture, it passes through an object, and is absorbed in a radiation image conversion panel. As the result, a part of energy is accumulated in stimulable phosphor and partly discharged as instantaneous emission. Further, a part of energy is also discharged as persistence of the instantaneous emission, even after radiation exposure from the radiation source is terminated.

Instantaneous excitation spectrum of the present invention means an excitation spectrum obtained by scanning excitation wavelengths on the shorter wavelength side employing the instantaneous emission wavelength as a monitoring wavelength.

The instantaneous excitation spectral width described here is defined as an excitation spectral width obtained via measurement under the conditions of an excitation BANDPASS of 1.5 nm, an emission BANDPASS of 1.5 nm, a scanning speed of 60 nm/min and a response of 0.5 sec, employing a Hitachi F3010 type spectrofluorometer.

A sample in which a layer comprising a measured stimulable phosphor of 150 g/m² is coated on a support is employed as a measured sample, and is subsequently set at an angle of 45 degree to incident light in the Hitachi F3010 type spectrofluorometer for measurements as described above.

In the present invention, a spectral width at an intensity of 80% to the maximum intensity (hereinafter, referred to also as "80% intensity spectral width") is 23.0 nm or less, and preferably at 22.0 nm or less. The 80% intensity spectral width is associated with a factor indicating a state of stimulable phosphor crystals, and the higher crystallinity, the narrower the width tends to be. In the case of an 80% intensity spectral width of 23.0 nm or less, stimulable phosphor presumably exhibits high crystallinity and undergoes less X-ray damage. There is no lower limit to the 80% intensity spectral width, but a spectral width of less than 19.0 nm is difficult to be realized as far as a current method of manufacturing stimulable phosphor is concerned. In addition, in order to improve various characteristics of images such as an emission characteristic, an uplift characteristic, a fading characteristic and so forth, the stimulable phosphor contains a slight amount of an alkali metal, an alkaline earth metal, a rare earth element and so forth as elements constituting crystals as described above to produce lower crystallinity. Thus, even though higher crystallinity is merely to be made, various characteristics of stimulable fluorescence are deteriorated, whereby there appears a problem such that image quality is degraded. Accordingly, the above-described specific effects were produced by the present invention having a feature in which the 80% intensity spectral width is 23.0 nm or less as described above, and this is not one that can be easily conceived.

In FIG. 1, shown are an instantaneous excitation spectrum, an instantaneous emission spectrum and an 80% intensity spectral width of a radiation image conversion panel comprising CsBr:Eu stimulable phosphor.

In order to set the 80% intensity spectral width to 23.0 nm or less, the preparation condition, an amount ratio of materials and so forth in the preparation of stimulable phosphor are desired to be adjusted.

The stimulable phosphor of the present invention is represented by foregoing Formula (1), but a stimulable phosphor with y=0 in Formula (1) is preferable.

[Preparation of Stimulable Phosphor Precursor]

The preparation method of a stimulable phosphor precursor described in Japanese Patent O.P.I. Publication No. 10-140148 and the apparatus for preparing a phosphor precursor described in Japanese Patent O.P.I. Publication No. 10-147778 are preferably applicable to preparing a stimulable phosphor precursor by a liquid phase. The stimulable phosphor precursor refers to the state at which a material represented by foregoing Formula (1) has not yet been subjected to a temperature of 600° C. or higher and the stimulable phosphor precursor emits neither stimulated emission nor instantaneous emission. In the present invention, the precursor is preferably prepared by the liquid phase synthesis.

An oxygen-introduced rare earth activated alkaline earth metal fluorohalide stimulable phosphor obtained from above-described Formula (1) is preferably prepared through the liquid phase process in which the particle size can be easily controlled, rather than through the solid phase process in which control of the particle form is difficult.

It is specifically preferred to prepare a stimulable phosphor through the liquid phase process.

The method comprises the steps of:

preparing an aqueous solution containing $BaI_2$ at a concentration of at least 3.3 mol/L (preferably, at least 3.5 mol/L) and a halide of Ln, provided that when "x" of Formula (I) is not zero, the mother liquor further contains a halide of $M^2$ and when "y" of Formula (I) is not zero, the solution further contains $BaBr_2$ and a halide of $M^1$;

adding an aqueous solution containing at least 5 mol/L (preferably at least 8 mol/L) of inorganic fluoride (preferably, ammonium fluoride or alkali metal fluoride) into the solution to form a crystalline precipitate of a precursor of a rare earth activated alkaline earth metal fluorohalide stimulable phosphor, removing a solvent from the reaction solution while adding the inorganic fluoride;

separating the crystalline precipitate of the precursor from the solution; and calcining the separated precursor precipitate while avoiding sintering (preferably calcining at a temperature of 400-1300° C. for 0.5-12 hours).

Particles (crystals) of the present invention preferably have an average particle diameter of 1-10 μm and are preferably mono-dispersible.

From electron micrographs of particles (crystals), 200 particles were selected at random, and an average particle diameter of the present invention was determined based on a volume-based particle diameter in spherical conversion.

Next, the method of preparing stimulable phosphors will be detailed.

[Preparation of Phosphor Precursor Precipitate and Preparation of Stimulable Phosphor]

Initially, material(s) except for a fluoride compound are dissolved in an aqueous medium. Thus, a barium halide, e.g., $BaI_2$ and a halide of Ln (if desired, a halide of $M^2$ and a halide of $M^1$) are each added into an aqueous solvent and dissolved with stirring to prepare an aqueous solution. The amounts of a barium halide (e.g., $BaI_2$) and the aqueous solvent are adjusted in advance so as to have at least 3.3 mol/L (and preferably at least 3.5 mol/L) of a concentration of a barium halide (e.g., $BaI_2$). Insufficient barium concentrations do not form a precursor with the intended composition or forms precursor particles with excessively larger sizes even if obtained. As a result of studies by the inventors, it was proved that fine precursor particles can be obtained at a concentration of at least 3.3 mol/L. A small amount of acid, ammonia, alcohol, water-soluble polymer or fine grained powder of water-insoluble metal oxide may be added thereto, if desired. It is also preferred that lower alcohols (e.g., methanol, ethanol) are added within a range which markedly lowers the solubility of $BaI_2$. The resulting aqueous solution (reaction mother liquor) is maintained at 80° C.

Subsequently, an aqueous solution of an inorganic fluoride (such as ammonium fluoride or alkali metal fluoride) is introduced into the aqueous solution maintained at 80° C. while stirring. The aqueous solution is preferably introduced to a portion in which stirring is vigorously performed. Introduction of the aqueous inorganic fluoride solution into the reaction mother liquor results in precipitation of precursor crystals of the oxygen-introduced rare earth activated alkaline earth metal fluorohalide phosphor represented by foregoing Formula (1). As to a rare earth activated alkaline earth metal fluorohalide phosphor of the present invention, concentration and quantity of the aqueous inorganic fluoride solution are to be optimized in order to set the spectral width at an intensity of 80% with respect to the maximum intensity of the instantaneous excitation spectrum to 23.0 nm or less.

In the present invention, a solvent is removed from the reaction mother liquor during addition of the aqueous inorganic fluoride solution. When removing the solvent is no object as far as "during addition" is concerned. A ratio of the total weight after removing the solvent to the weight before removing the solvent (the sum of the reaction mother liquor in weight and the added aqueous solution in weight) is preferably 0.97 or less. In the case of a ratio exceeding this value, crystals tend to be difficult to be turned to BaFI. Therefore, the removal ratio is preferably 0.97 or less, and more preferably 0.95 or less. Excessive removal results in excessively increased viscosity of the reaction solution, often producing troubles in handling.

It is therefore preferred to remove a solvent up to a ratio of 0.5. The time required for solvent removal largely affects not only productivity but also the particle shape and the particle diameter distribution, so that an optimal removal method is selected. In general, the reaction solution is heated to evaporate a solvent and this method is also beneficial in the present invention. A precursor having a desired composition can be obtained via removal of solvents. Another method of removing a solvent is preferably employed in combination to enhance productivity and retain optimal particle shape. The use of a separation membrane such as a reverse osmosis membrane can also be selected. In this invention, the following removing methods are preferred in terms of productivity.

1. Dry Gas Aeration

In a closed reaction vessel, two or more openings are provided, through which dry gas is allowed to pass. Any gas is optionally selected but common air or nitrogen is preferred in terms of safety. The solvent is removed concomitantly with the blowing gas, depending on the saturated water vapor content in the gas. Besides permeating through openings in the reaction vessel, it is useful to allow the gas to bubble through a liquid phase to cause the solvent to be absorbed into the bubbles.

2. Reduced Pressure

As is well known, vapor pressure of a solvent is lowered by reducing the pressure. Thus, the solvent is efficiently removed under reduced pressure, that is, by maintaining the inside of a reaction vessel containing a reaction vessel under reduced pressure. The extent of the reduced pressure is optimally selected, depending on the kind of solvent. In cases where water is used as a solvent, for example, the reduced pressure is preferably 86 kPa or less.

3. Liquid Membrane

Removal of solvent can be efficiently effected by enlarging the vaporization area. In cases when undergoing reaction by heating with stirring in a reaction vessel of a given volume, heating is generally done in such a manner that a heating means is immersed into the liquid or is provided outside the vessel. In this case, the heat transfer area is limited to the portion of the heating means in contact with the liquid, so that the heat transfer area decreases with removal of the solvent, retarding removal of the solvent. To prevent such retardation, using a pump or a stirrer, the reaction solution is sprayed onto the wall of the reaction vessel to increase the heat transfer area. This method of spraying liquid onto the wall of the reaction vessel to form a liquid membrane is known as a wetted wall method. The wetted wall can be formed not only using a pump but also using a stirrer described in Japanese Patent O.P.I. Publication Nos. 6-335627 and 11-235522.

These methods are employed alone or in combination. Examples thereof include the combination of the formation of the wetted wall and maintaining the reaction vessel under the reduced pressure and the combination of the formation of the wetted wall and dry gas aeration. Of these, the former is preferred, as described in Japanese Patent O.P.I. Publication Nos. 6-335627 and 2003-236303.

The resulting crystals of the phosphor precursor are separated from the solution through filtration or centrifugation, washed sufficiently with liquid such as methanol and then dried. To the dried crystals of the phosphor precursor is added an anti-sintering agent such as fine alumina powder or fine silica powder, which adheres to the surface of the crystals. It is possible to save addition of the anti-sintering agent by selecting the calcination conditions.

Further, the phosphor precursor crystals are charged into a heat-resistant vessel such as a silica port, an alumina crucible or a silica crucible and then placed in the core portion of an electric furnace to be calcined, without causing the crystals to sinter. The calcination temperature is preferably 400-1300° C. and more preferably 500-1000° C. The calcination time, which depends on amounts of phosphor raw materials to be charged, calcination temperature and a temperature at the time of taking-out from the furnace, is preferably 0.5-12 hrs.

As a calcination atmosphere is employed a nitrogen gas atmosphere, a neutral atmosphere such as an argon gas atmosphere, a nitrogen gas atmosphere containing a small amount of hydrogen gas, a weakly reducible atmosphere such as a carbon dioxide atmosphere containing carbon monoxide, or an atmosphere containing a small amount of oxygen. Calcination is effected preferably employing the method described in Japanese Patent O.P.I. Publication No. 2000-8034. An intended oxygen-introduced rare earth activated alkaline earth metal fluorohalide stimulable phosphor can be obtained through the calcinations described above. Thus, a radiation image conversion panel comprising a phosphor layer formed by using the above-described phosphor can be obtained.

[Preparation of Radiation Image Conversion Panel]

As supports used in the radiation image conversion panel according to the invention are employed a various types of polymeric materials, glass and metals. Materials which can be converted to a flexible sheet or web are particularly preferred in handling as a information recording material. From this point, there are preferred plastic resin films such as cellulose acetate films, polyester films, polyamide films, polyimide films, triacetate films or polycarbonate films; metal sheets such as aluminum sheets, iron sheets, copper sheets or chromium sheets; or metal sheets having a covered layer made of a metal oxide thereof.

Thickness of the support depends on properties of the material, and is generally 10-1000 μm and preferably 10-500 μm in terms of handling.

The surface of the support may be smooth or may be matte for the purpose of enhancing adhesiveness to a stimulable phosphor layer. The support may be provided with a subbing layer under the stimulable phosphor layer for the purpose of enhancing adhesiveness to the phosphor layer.

Examples of binders used in the subbing layer include proteins such as gelatin, polysaccharide such as dextran, natural polymeric materials such as arabic gum and synthetic polymeric materials such as polyvinyl butyral, polyvinyl acetate, nitrocellulose, ethylcellulose, vinylidene chloride-vinyl chloride copolymer, polyalkyl (metha)acrylate, vinyl chloride-vinylacetate copolymer, polyurethane, cellulose acetate butyrate, polyvinyl alcohol and linear polyester. Of these binders are preferred nitrocellulose, linear polyester, polyalkyl (metha)acrylate, a mixture of nitrocellulose and linear polyester, a mixture of nitrocellulose and polyalkyl (metha)acrylate and a mixture of polyurethane and polyvinyl butyral. The binder may be cross-linked with a cross-linking agent.

The stimulable phosphor layer can be coated on a subbing layer, for example, according to the following manner.

Thus, an iodide-containing stimulable phosphor, a compound such as phosphite ester for preventing yellow stain and binder are added into an appropreate solvent to prepare a coating solution in which phosphor particles and particles of the compound(s) are uniformly dispersed in a binder solution.

Binders for film-making used in the conventional layer constitution are usable as the binder used in the stimulable phosphor layer of the present invention, including proteins such as gelatin, polysaccharides such as dextrin or Arabic gum, polyvinyl butyral, polyvinyl acetate, nitrocellulose, ethyl cellulose, vinylidene chloride-vinyl chloride copolymer, polymethyl methacrylate, vinyl chloride-vinyl acetate copolymer, polyurethane, cellulose acetate butyrate, and polyvinyl alcohol.

As to a stimulable phosphor layer coating solution, the binder is employed in an amount of 0.01-1 part by weight per 1 part by weight of the stimulable phosphor. A smaller amount of the binder is preferred in terms of sensitivity and sharpness of the radiation image conversion panel and a range of 0.03-0.2 parts by weight is preferred in terms of easiness of coating.

Examples of solvents used for the stimulable phosphor layer coating solution include lower alcohols such as methanol, ethanol, 1-propanol and butanol; ketones such as acetone, methyl ethyl ketone, methyl isobutyl ketone and cyclohexanone; esters a lower fatty acid and a lower alcohol, such as methyl acetate, ethyl acetate and butyl acetate; ethers such as dioxane, ethylene glycol monoethyl ether and ethylene glycol monomethyl ether; aromatic compounds such as tolyol and xylol; halogenated hydrocarbons such as methylene chloride and ethylene chloride; and their mixtures.

There may be incorporated, in the coating solution, a variety of additives, such as a dispersing agent for improving dispersibility of the phosphor in the coating solution and a plasticizer for enhancing bonding strength between the binder and phosphor. Examples of the dispersing agent include phthalic acid, stearic acid, caproic acid and oleophilic surfactants. Examples of the plasticizer include phosphate esters such as triphenyl phosphate, tricresyl phosphate and diphenyl phosphate; phthalate esters such as diethyl phthalate, dimethoxyethyl phthalate; glycolic acid esters such as ethylphthalyethyl glycolate and dimethoxyethyl glycolate; and polyesters of polyethylene glycol and aliphatic dibasic acid such as polyester of triethylene glycol and adipinic acid, and polyester of diethylene glycol and succinic acid.

Incidentally, the coating solution as prepared above was uniformly coated on the subbing layer surface to form a coated layer. Coating can be conducted by conventional coating means, such as a doctor blade, a roll coater and a knife coater. Subsequently, the coated layer is gradually heated and dried to complete formation of the stimulable phosphor layer provided on a subbing layer.

The stimulable phosphor layer coating solution can be prepared by using a dispersing apparatus, such as a ball mill, a sand mill, an attritor, a three-roll mill, a high-speed impeller, a Kady mill or an ultrasonic homogenizer. The resulting coating solution is coated on a support by using a doctor blade, a roll coater or a knife coater, and dried to form a stimulable phosphor layer. After the above coating solution may be coated on a protective layer and dried, the stimulable phosphor layer may adhere to the support.

The thickness of the stimulable phosphor layer in the radiation image conversion panel, depending of characteristics of the intended radiation image conversion panel, kinds of stimulable phosphors and a mixing ratio of a binder to phosphor, is preferably 10-1000 μm, and more preferably 10-500 μm.

A phosphor sheet in which a stimulable phosphor layer is coated on a support is cut to predetermined size. Though any method is allowed to be used for cutting, a trimmer and a punching machine are preferable in view of workability and accuracy.

A phosphor sheet cut to predetermined size is generally sealed with moisture resistant protective films. Examples of the sealing method include a method in which a phosphor sheet is covered by the upper and lower moisture resistant protective films, and the peripheral portions are fused by heating and sealed employing an impulse sealer; and a method of lamination in which pressure is applied between two heated rollers while heating.

In the above-described method of fusing by heating employing an impulse sealer, it is preferred to fuse by heating at reduced pressure since the position displacement of moisture resistant protective films is possible to be prevented, and moisture in the air is also possible to be eliminated.

EXAMPLE

Next, the present invention will now be described in detail referring to examples, but the present invention is not limited thereto. In the examples, "%" is % by weight, unless otherwise specifically mentioned.

Example

[Preparation of Radiation Image Conversion Panel]

(Preparation of Stimulable Phosphor)

(Preparation of Precursor 1)

Into a pressure reaction vessel having two openings, 2500 ml of an aqueous $BaI_2$ solution (3.4 mol/L) was charged to synthesize an europium activated barium fluoroiodide stimulable phosphor precursor. Further, 11 g of $EuI_3.2H_2O$ and 104 g of potassium iodide were added.

Reaction mother liquor in this reaction vessel was maintained at 95° C. while stirring. Then, 1000 ml of an aqueous ammonium fluoride solution (6 mol/L) was added into this mother liquor employing a roller pump to form precipitates, while aerating dry air at 10 L/min. The weight ratio of a reaction mixture between before and after aerating dry air after completing the reaction was 0.92. After stirring at the temperature maintained for 90 minutes, filtration was conducted, and washing was subsequently carried out with 2000 ml of ethanol to prepare precursor 1.

(Preparation of Precursors 2-8)

Each of precursors 2-8 was prepared similarly to preparation of precursor 1, except that concentration of an aqueous ammonium fluoride solution was changed, and the total amount of 6 mol was charged.

(Calcination)

The following calciation was conducted by using each of the precipitates (precursor crystals) obtained above. Each precursor was treated by adding 1% by weight of ultra-fine alumina powder in order to prevent change in particle shapes caused by sintering and change in the particle size distribution due to inter-particle fusing, and fully stirring the mixture by a mixer to attach ultra-fine alumina powder evenly to the surfaces of the crystals.

The resulting was placed in a quartz boat, and calcinated at 850° C. for 2 hours in the hydrogen gas atmosphere employing a tube furnace to obtain europium-activated barium fluoroiodide phosphor particles.

(Surface Treatment)

Next, after 100 grams of the resulting phosphor particles were immersed in an ethanol dispersion containing 2 grams of a silane coupling agent (γ-mercaptopropyltrimethoxy silane) to be slurry, the resulting was dried at 80° C. for 3 hours after filtration and mortar pulverization, and classified to prepare phosphor particles having an average particle diameter of 7 μm.

(Formation of Subbing Layer)

The following subbing layer coating solution was coated onto a foamed polyethylene terephthalate film (188E60L, produced by Toray Industries, Inc) having a thickness of 188 μm employing a doctor blade, and dried at 100° C. for 5 minutes to form a subbing layer having a dry thickness of 30 μm.

(Subbing Layer Coating Solution)

Into 288.2 g of a dissolved polyester resin (VYLON 55SS, produced by Toyobo Co., Ltd. and a solid content of 35%), mixed were 0.34 g of dispersed β-copper phthalocyanine (a solid content of 35% and a pigment content of 30%) and 11.22 g of a polyisocyanate compound (CORONATE HX produced by Nippon Polyurethane Industry Co. Ltd.) as a hardener, and the system was dispersed with a propeller mixer to prepare a subbing layer coating solution.

(Preparation of Phosphor Layer Coating Solution)

Three hundred grams of each stimulable phosphor prepared above and 52.63 g of a polyurethane resin (VYLON 630, produced by Nippon Polyurethane Industry Co. Ltd., a solid content of 30%, and a solvent of methylethylketone/toluene=5/5) were added into a mixed solvent of 0.13 g of methylethylketone, 0.13 g of toluene and 41.84 g of cyclohexane, and the system was dispersed with a propeller mixer to prepare a phosphor layer coating solution.

(Preparation of Phosphor Layer and Phosphor Sheet)

On the subbing layer formed above, coated was each coating solution so as to have a thickness of 180 μm employing a doctor blade and dried at 100° C. for 15 minutes to form a phosphor layer and to prepare phosphor sheets.

(Preparation of Moisture Resistance Protective Film)

Layer configuration (A) was used as a protective film on the phosphor layer-coated surface side of each of phosphor sheets prepared above.

Layer Configuration (A)

NY15///VMPET12///VMPET12///PET12///CPP20 where NY: Nylon,

PET: Polyethylene terephthalate,

CPP: Casted polypropylene, and

VMPET: Alumina-deposited PET (commercially available, produced by Toyo Metalizing Co., Ltd.).

The number following the name of each resin film represents the resin layer thickness (in μm).

"///" represents a dry lamination adhesive layer of 3.0 μm in thickness. A two liquid reaction type urethane adhesive was used as an adhesive for the utilized dry lamination.

The protective film on the back side of a phosphor sheet is a dry lamination film composed of CPP30//aluminum film9//polyethylene terephthalate film188. Further, the adhesive layer represented by "//" has a thickness of 1.5 μm, and a two liquid reaction type urethane adhesive was used in this case.

(Setup of Radiation Image Conversion Panel)

After the foregoing resulting phosphor sheets were each cut to a square, 20 cm on a side, the peripheral portion of each of them was fused and sealed by an impulse sealer under reduced pressure, employing the foregoing moisture resistance protective film to obtain each of radiation image conversion panels. In addition, a distance of 1 mm was taken from the fused portion to the peripheral portion of the phosphor sheet for fusion. The impulse sealer used for fusion employed a 3 mm wide heater.

[Measurement and Evaluation of Radiation Image Conversion Panel]

(Measurement of 80% Intensity Spectral Width)

A coating piece with no sealed film was set to a Hitachi F3010 type spectrofluorometer at an angle of 45 degree to incident light, and excitation wavelength was scanned from 250 nm to 390 nm under the conditions of an excitation BANDPASS of 1.5 nm, an emission BANDPASS of 1.5 nm, a scanning speed of 60 nm/min, a response of 0.5 sec and a monitoring wavelength of 405 nm to measure excitation spectra. The spectral width at an intensity of 80% to the peak intensity was measured.

(X-ray Damage)

Luminance was measured employing a Regius 170, manufactured by Konica Minolta. After the radiation image conversion panels were each exposed to 200 mR X-rays at a bulb voltage of 80 kVp, a signal value of the stimulated luminescence which was read out in the Regius 170 accuracy mode was defined as luminance, and a relative luminance of after compulsory degradation treatment of a radiation image conversion panel to before the compulsory degradation treatment of the radiation image conversion panel was calculated.

As to the compulsory degradation treatment, the radiation image conversion panel was exposed to 200 mR X-rays at a bulb voltage of 80 kVp and erased by Regius 170 500 times.

A relative luminance of at least 0.80 (80%) is practically acceptable.

TABLE 1

| Radiation image conversion panel No. | 80% Intensity spectral width (nm) | Relative intensity after X-ray damage | Remarks |
| --- | --- | --- | --- |
| 1 | 20.8 | 0.87 | Present invention |
| 2 | 21.8 | 0.86 | Present invention |
| 3 | 20.8 | 0.89 | Present invention |
| 4 | 19.8 | 0.89 | Present invention |
| 5 | 20.4 | 0.90 | Present invention |
| 6 | 20.6 | 0.90 | Present invention |
| 7 | 22.2 | 0.84 | Present invention |
| 8 | 23.8 | 0.78 | Comparative example |

As is clear from Table 1, it is to be understood that samples of the present invention exhibit less degradation in luminance caused by X-ray damage even after repetitive exposure of 500 times. In addition, the resulting radiation images maintained high image quality at the initial stage even after the repetitive exposure.

What is claimed is:

1. A rare earth activated alkaline earth metal fluorohalide stimulable phosphor represented by the following Formula (1), wherein a spectral width at an intensity of 80% to the maximum intensity of an instantaneous excitation spectrum is 23.0 nm or less, $$Ba_{(1-x)}M^2_{(x)}FBr_{(y)}I_{(1-y)}:aM^1, bLn, cO \qquad \text{Formula (1)}$$

wherein $M^1$ is at least an alkali metal selected from the group consisting of Li, Na, K, Rb and Cs; $M^2$ is at least an alkaline earth metal selected from the group consisting of Be, Mg, Sr and Ca; Ln is at least a rare earth element selected from the group consisting of Ce, Pr, Sm, Eu, Gd, Tb, Tm, Dy, Ho, Nd, Er and Yb; and x, y, a, b and c are values meeting the following conditions: $0 \leq x \leq 0.3$, $0 \leq y \leq 0.9$, $0 \leq a \leq 0.05$ $0 < b \leq 0.2$ and $0 \leq c \leq 0.1$, respectively.

2. The rare earth activated alkaline earth metal fluorohalide stimulable phosphor of claim 1,
wherein the spectral width is 22.0 nm or less.

3. The rare earth activated alkaline earth metal fluorohalide stimulable phosphor of claim 1,
wherein y in Formula (1) is equal to 0.

4. A radiation image conversion panel comprising a support and provided thereon, a stimulable phosphor layer,
wherein a stimulable phosphor contained in the stimulable phosphor layer is the rare earth activated alkaline earth metal fluorohalide stimulable phosphor of claim 1.

* * * * *